United States Patent
Jackson et al.

(10) Patent No.: US 6,846,443 B1
(45) Date of Patent: Jan. 25, 2005

(54) METHOD FOR FORMING AN IMPROVED CONTAINER

(75) Inventors: Douglas J Jackson, Wayne, NJ (US); Daniel L King, Sussex, NJ (US)

(73) Assignee: Pechiney Plastic Packaging, Inc, Chicago, IL (US)

( * ) Notice: Subject to any disclaimer, the term of this patent is extended or adjusted under 35 U.S.C. 154(b) by 0 days.

(21) Appl. No.: 10/220,527

(22) PCT Filed: Sep. 15, 2000

(86) PCT No.: PCT/US00/25192
§ 371 (c)(1),
(2), (4) Date: Dec. 16, 2002

(87) PCT Pub. No.: WO01/70474
PCT Pub. Date: Sep. 27, 2001

Related U.S. Application Data
(60) Provisional application No. 60/189,868, filed on Mar. 16, 2000.

(51) Int. Cl.⁷ .......................... B29C 45/14; B29C 33/42
(52) U.S. Cl. .................. 264/242; 264/250; 264/259; 264/268; 264/275
(58) Field of Search .............................. 264/242, 250, 264/254, 255, 259, 264, 266, 268, 275; 421/129.1, 130, 573, 576, 577; 215/42, 43, 44; 425/129.1, 130, 573, 576, 577

(56) References Cited

U.S. PATENT DOCUMENTS

| | | | | |
|---|---|---|---|---|
| 2,313,031 A | * | 3/1943 | Parkhurst | 222/107 |
| 2,713,369 A | * | 7/1955 | Strahm | 222/107 |
| 2,788,544 A | * | 4/1957 | Voumard et al. | 425/384 |
| 3,286,010 A | * | 11/1966 | Groningen | 264/242 |
| 4,021,524 A | * | 5/1977 | Grimsley | 264/242 |
| 4,117,950 A | * | 10/1978 | Allen | 220/782 |
| 4,470,521 A | | 9/1984 | Scammell | 222/107 |
| 4,518,554 A | * | 5/1985 | Hatakeyama et al. | 264/262 |
| 4,988,472 A | | 1/1991 | Orimoto et al. | 264/273 |
| 5,219,373 A | * | 6/1993 | Hatakeyama et al. | 29/458 |
| 5,292,034 A | * | 3/1994 | Keller | 222/107 |
| 5,322,658 A | * | 6/1994 | Holoubek et al. | 264/150 |
| 5,447,674 A | | 9/1995 | Schellenbach | 264/255 |
| 5,705,112 A | * | 1/1998 | Gram | 264/242 |
| 6,129,880 A | * | 10/2000 | Kieras et al. | 264/230 |
| 6,210,621 B1 | * | 4/2001 | Usen et al. | 264/263 |
| 6,524,512 B1 | * | 2/2003 | Mintgen et al. | 264/255 |
| 6,551,543 B1 | * | 4/2003 | Keller et al. | 264/478 |

FOREIGN PATENT DOCUMENTS

| | | |
|---|---|---|
| CH | 245861 | 11/1946 |
| DE | 1080297 | 4/1960 |
| DE | 2118841 | 5/1973 |
| FR | 1305166 | 9/1962 |
| GB | 1038897 | 8/1966 |

OTHER PUBLICATIONS

European Search Report dated Apr. 24, 2003.

* cited by examiner

Primary Examiner—Angela Ortiz
(74) Attorney, Agent, or Firm—Ohlandt, Greeley, Ruggiero & Perle L.L.P.

(57) ABSTRACT

A tubular dispensing container has a head whose shoulder is joined to a tubular body. The head and shoulder can be thin because they are provided with a plurality of ribs that extend axially from the neck to the lower end of the shoulder and rigidify the head. A head for a tubular dispensing container is provided having the above-mentioned ribs.

Apparatus for forming the head has male or female tooling with axially grooves formed therein to form the ribs on the inside or outside surface of the head.

Methods involve flowing moldable material along the grooves to provide the lower end of the shoulder of the head with enough moldable material at elevated temperature and pressure to form a good bond of the shoulder with the tubular body.

2 Claims, 5 Drawing Sheets

METHOD FOR FORMING AN IMPROVED CONTAINER

This application claims benefit of 60/189,868 filed Mar. 16, 2000.

FIELD OF THE INVENTION

This invention relates to containers, for example, collapsible dispensing containers, e.g., tubes, for packaging food, dentifrice, cosmetic, industrial, home use and other products. More particularly, this invention is directed to improved containers, e.g., collapsible dispensing containers, that have plastic upper portions, e.g., heads, that have thinned portions. In the improved containers, the upper portions, e.g., the shoulders of the heads, have sufficient rigidity for the process to resist deformation and are securely bonded to the bodies of the containers.

BACKGROUND OF THE INVENTION

There has been an on-going effort to reduce the cost of making containers. Efforts have been made to reduce the amount of materials used to make the containers. With respect to dispensing containers having an orifice in a substantially rigid upper portion that is joined to a body portion, e.g., collapsible dispensing containers having and orifice in a substantially rigid head whose shoulder is joined to a squeezable or collapsible body, efforts have been directed to reducing the thickness of the upper portion or head. However, these efforts have met with only limited success. When the thickness of the upper portion, e.g., the portion of the shoulder of the head that is joined to the upper end portion of the body, has been reduced, the bond at the joint between the shoulder and the body has lacked sufficient strength to maintain the integrity and seal of the joint. One problem has been that with a thinned shoulder, there has not been an effective way to provide enough plastic material of the shoulder at a high enough temperature to and at the area of the joint with the upper portion of the body wall, to obtain an effective joint and seal. For example, in injection molding processes that inject heads from or through the rim of the orifice of the head to the portion, usually the lower, portion of the shoulder, the temperature of the thinned plastic material drops as it travels through the mold cavity to the area of the shoulder where the temperature of the plastic is not high enough to form a satisfactory bond to the body wall. Although the injection gate can be towards the shoulder to shorten the travel and achieve the bond, it makes it more difficult to back fill the head without flashing the shoulder joint.

It would be desirable to provide low cost containers, especially of the collapsible dispensing type, that employ less materials to produce and that have sufficient strength and integrity. It would also be desirable to provide improved methods and apparatus for forming such containers.

It is an object of this invention to provide improved low cost containers of the above-described type, and methods and apparatus for forming them, that overcome one or more of the above-described problems and/or meet one or more of the above mentioned desires.

SUMMARY OF THE INVENTION

This invention is directed to a method of molding a dispensing tube having a thin head joined to a tubular body, which comprises:

molding the head of a material that is moldable at elevated temperatures in a tool set having a mold cavity shaped in the form of a head and formed by female tooling for forming the exterior surface of the head and by a male die member for forming the interior surface of the head, such that the head will have an inner surface, an outer surface, a neck with an upper end, and a shoulder having a lower end for being joined to the upper end of the tubular body, providing a plurality of elongated grooves in the outer surface of the male die member, the grooves extending axially from the portion of the die member that forms the neck to the portion of the die member that forms the lower end of the shoulder, the grooves providing channels for flow of the moldable material in molten state from the neck to the lower end of the shoulder, providing a tubular body having an upper end in the mold tooling such that the upper end is axially aligned with the female die member that forms the shoulder, providing the moldable material at an elevated temperature into the mold cavity portion that is to form the head, flowing the moldable material along the grooves to and about the lower end of the shoulder at an elevated temperature and pressure, there being provided enough moldable material at the elevated temperature and pressure to the lower end of the mold cavity to join the upper end of the tubular body to the lower end of the shoulder, and utilizing said moldable material provided through the grooves for joining the upper end of the tubular body to the shoulder to form the dispensing tube, such that the inner surface of the head has a plurality of elongated ribs that are formed in the grooves, said ribs rigidifying the shoulder of the head and allowing the shoulder to be formed of less moldable material and to be thinner and the bond between the shoulder and the tubular body stronger than in the absence of said grooves and said ribs. Preferably the grooves are provided to extend axially from the upper end of the die member that forms the upper end of the head to the lower end of the shoulder.

The invention is also directed to apparatus for molding a head of a moldable material, the head being suitable for being joined to a tubular body to form a dispensing tube, which comprises:

a tool set having a mold cavity shaped in the form of a head, the tool set including female tooling for forming the exterior surface of the head and male tooling having an outer surface for forming the interior surface of the head, such that the head will have an inner surface, an outer surface, a neck with an upper end, and a shoulder having a lower end portion for being joined to the upper end of the tubular body, the outer surface of the male tooling having a plurality of elongated grooves therein and that extend axially from the portion of the male tooling that forms the neck to the portion of the male tooling that forms the lower end of the shoulder, the grooves providing channels for flow of the moldable material from the portion of the male tooling that forms the neck to the portion of the male tooling that forms the lower end of the shoulder.

The invention is further directed to a molded head suitable for being joined to the upper end of a tubular body to form a dispensing tube, comprised of:

a neck having an upper end, and a shoulder, the shoulder having a lower end portion suitable for being joined to the upper end of the tubular body, the neck and shoulder having an interior surface that has a plurality of spaced ribs, the ribs being one piece with the head and extending from the neck, preferably from its upper end to the lower end of the shoulder for rigidifying the head.

The shoulder can have web portions between the spaced ribs, and the thickness of the web portions preferably is from about 0.018 inch to about 0.029 inch, more preferably from about 0.023 inch to about 0.024 inch, and most preferably from about 0.020 inch to about 0.024 inch. The shoulder preferably has an outer surface and the ribs have an inner surface and the thickness of the ribs from said outer surface to said inner surface is about 0.040 inch, more preferably about 0.035 inch.

The invention is further directed to a tubular dispensing container, which comprises:

a molded head comprised of a neck having an upper end, and a shoulder, the shoulder having a lower end portion suitable for being joined to the upper end of the tubular body, the neck and shoulder having an interior surface that has a plurality of spaced ribs, the ribs being one piece with the head and extending from the neck to the lower end of the shoulder for rigidifying the head, and a tubular body having an upper end that is joined to the lower end of the shoulder. In the preferred tubular dispensing container, the diameter of the tubular body is from about ½ inch to about 2 inches.

DETAILED DESCRIPTION OF THE DRAWINGS

The drawings and description disclose preferred embodiments of the invention. Sheet A of the drawings shows preferred dimensions of a preferred head of the invention for an approximately 1 inch diameter tube. Sheet A-1 shows reference numbers for the head shown on Sheet A. Sheet A-2 shows less preferred dimensions of a head of the invention. Sheets B-1 through B-3 show enlargements of the views of the head shown on Sheets A and A-1.

FIG. 1 is a side elevation of a head 10 for a tubular container. The head has a neck 12 with a rim 14, an orifice 16, a throat 17, and a shoulder 18 with a lower portion 20. The rim is the upper portion of the neck that defines the orifice of the neck.

FIG. 2 is a bottom view of the head of FIG. 1. The head has a plurality of circumferentially spaced ribs 22 disposed thereabout. The ribs preferably are on the interior surface of the head, although they can be on the exterior of the head or a combination of both. The ribs preferably extend continuously into neck 12 up to rim 14 thereof. The head has sufficient rigidity without the ribs to be free standing, i.e. self-supporting. Thus, the portions 24 of the shoulder that are between the ribs are of a thickness sufficient to support the head. The perimeter of the interior surface of the shoulder can have a circumferential rib 23 that is preferably continuous and preferably joined to axially extending ribs 22.

FIG. 3 is a vertical section through a thread 30 on neck 12.

FIG. 4, a vertical section taken along line A—A through the opposed ribs 22 of head 10 shown in FIG. 2. FIG. 2 shows ribs 22 extending axially along the inner surface of the head, from rim 14 to the lower end or section 20 of shoulder 18. In this embodiment of the shoulder, it has a short axially depending skirt or lower edge 32. FIG. 4 shows the preferred thickness (0.040 inch) of the shoulder, measured from its outer surface to the inner surface of the underlying rib 22.

FIG. 5, a vertical section taken along line B—B of FIG. 2 through the shoulder portions between ribs 22. FIG. 2 shows the thickness of the shoulder portion 18 between ribs 22. The shoulder portions between ribs 22 that are sometimes referred to as 24, shall sometimes be referred to as webs or interstitial portions. Ribs 22 preferably are integral, i.e., one unitary piece with the rest of shoulder 18.

FIG. 6, an upper perspective view of the head of FIG. 1, shows a rib 22 in neck 12 of head 10.

FIG. 7, a lower perspective view of the head of FIG. 1, shows the circumferentially spaced ribs axially extending from rim 14 (not shown) to the lower edge 32 of shoulder 18.

FIG. 8 is a side elevation of a container 40. More particularly, FIG. 8 shows a tubular collapsible dispensing container 40 comprised of a tubular body 42, and a head 10 onto which there is threadedly secured a cap 44. A container for purposes of the invention includes an open ended container 40 as shown, or sealed at its bottom end (not shown) as well as a head attached, joined, bonded or secured to a body and open at one or both ends.

FIG. 9 is a top view of the container of FIG. 8.

FIG. 10, a bottom view of the container of FIG. 8, shows ribs 22 extending axially from the lower portion of shoulder 18 up into neck 12.

Figure 3:
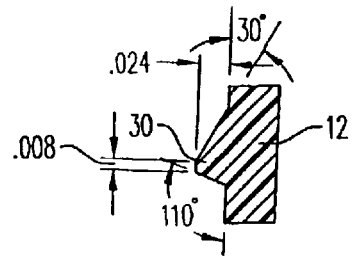
Figure 1:
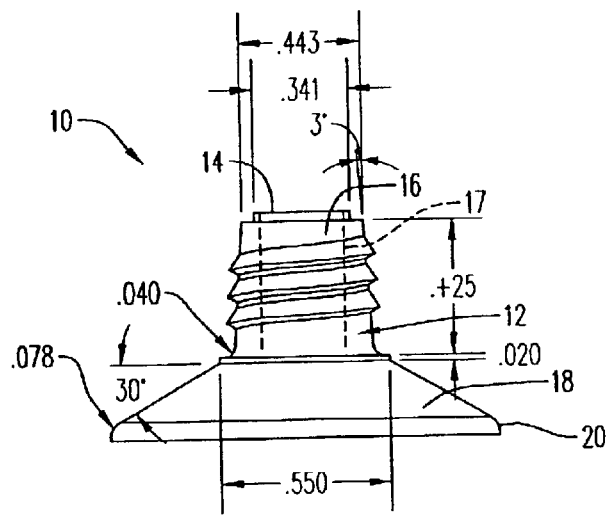
Figure 4:
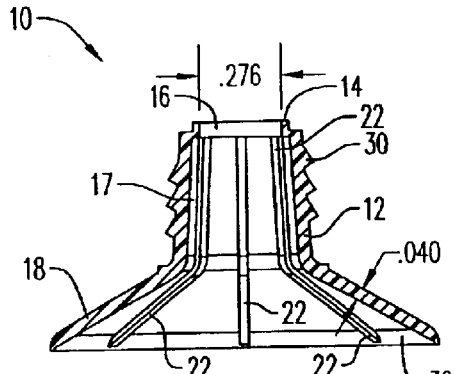
Figure 2:
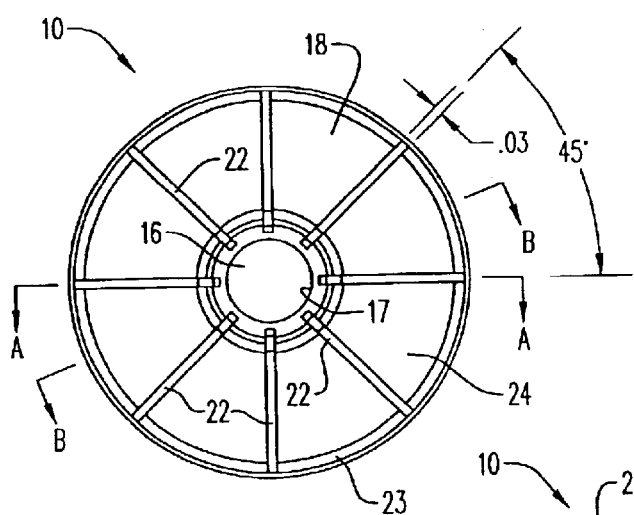
Figure 5:
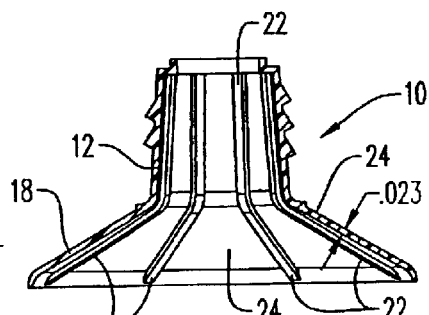
Figure 6:
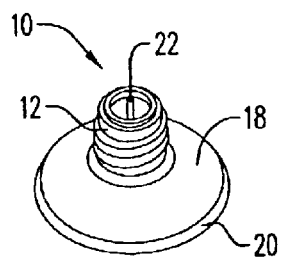
Figure 7:
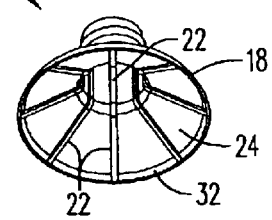
Figure 9:
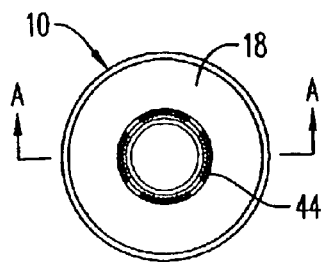
Figure 11:
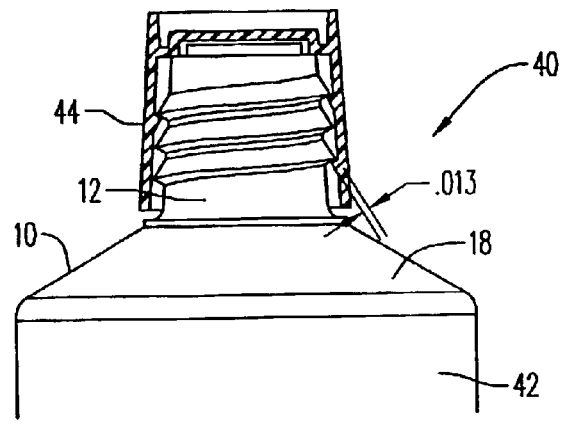
FIG. 11 is a vertical section taken along line A—A through the neck and cap of FIG. 9.
Figure 8:
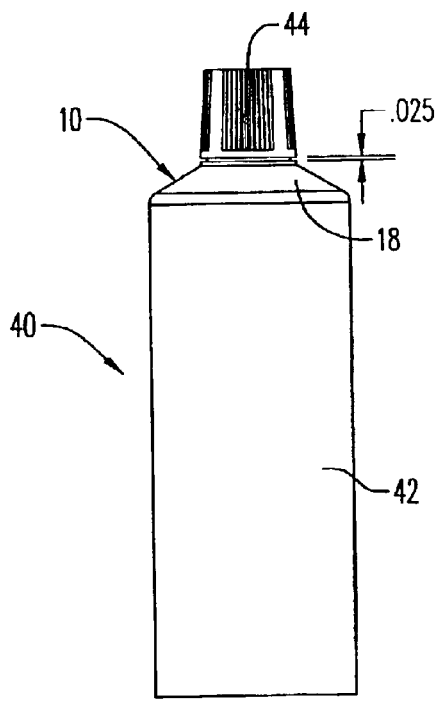
Figure 12:
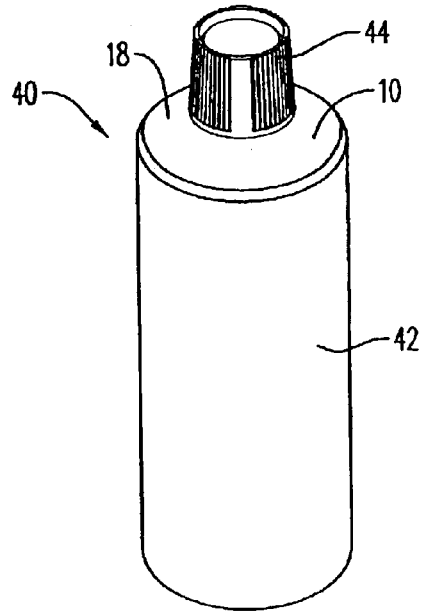
FIG. 12 is a perspective view of container 40 of FIG. 8.
Figure 10:
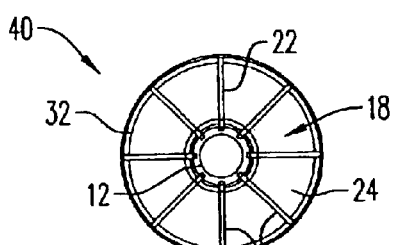

FIGS. 8 and 12 show that the shoulder 18 of head 10 is securely joined to body 44 and that a cap 44 can be threadedly secured to neck 12 of head 10.

Figure 13:
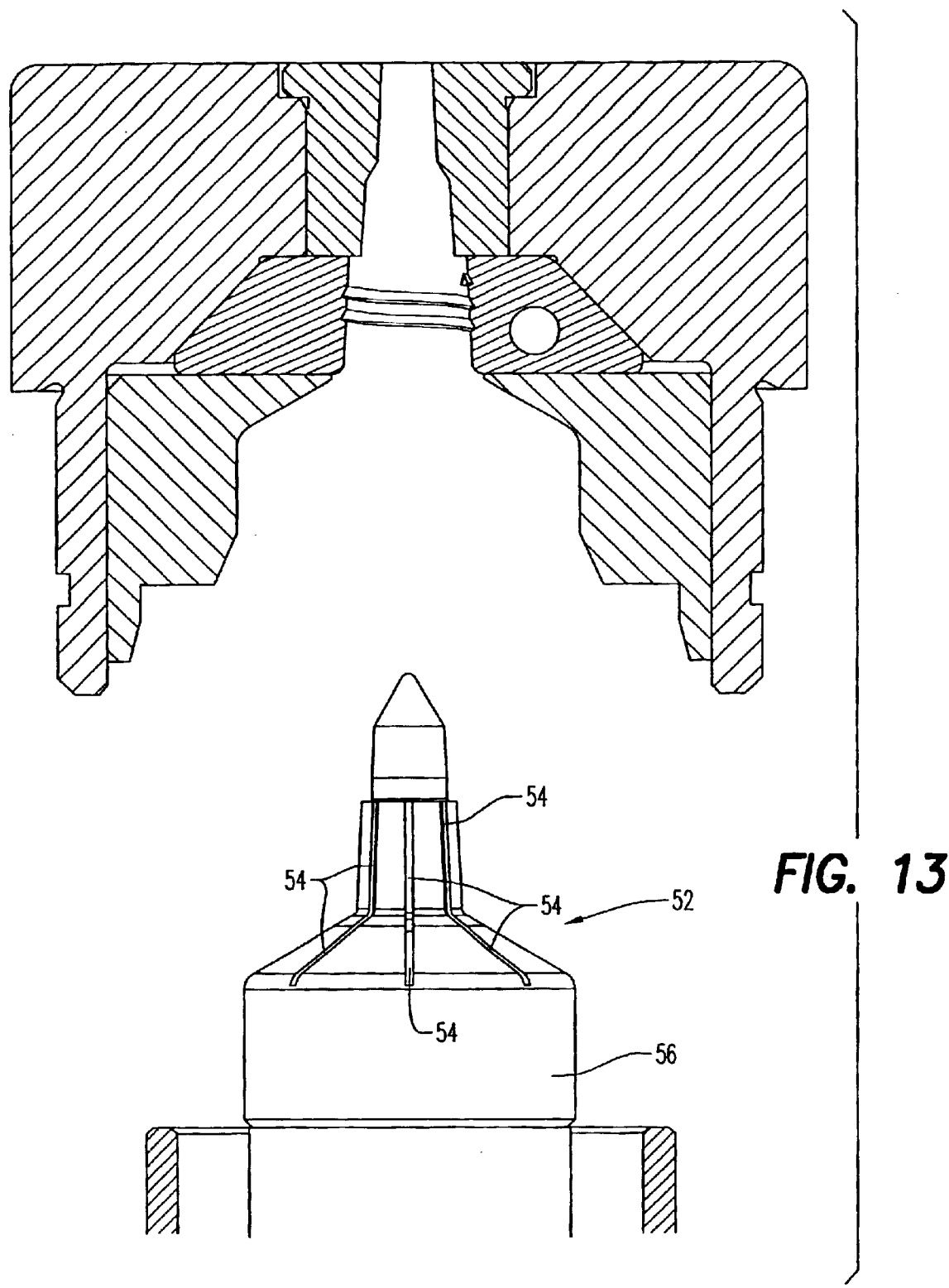
Figure 14:
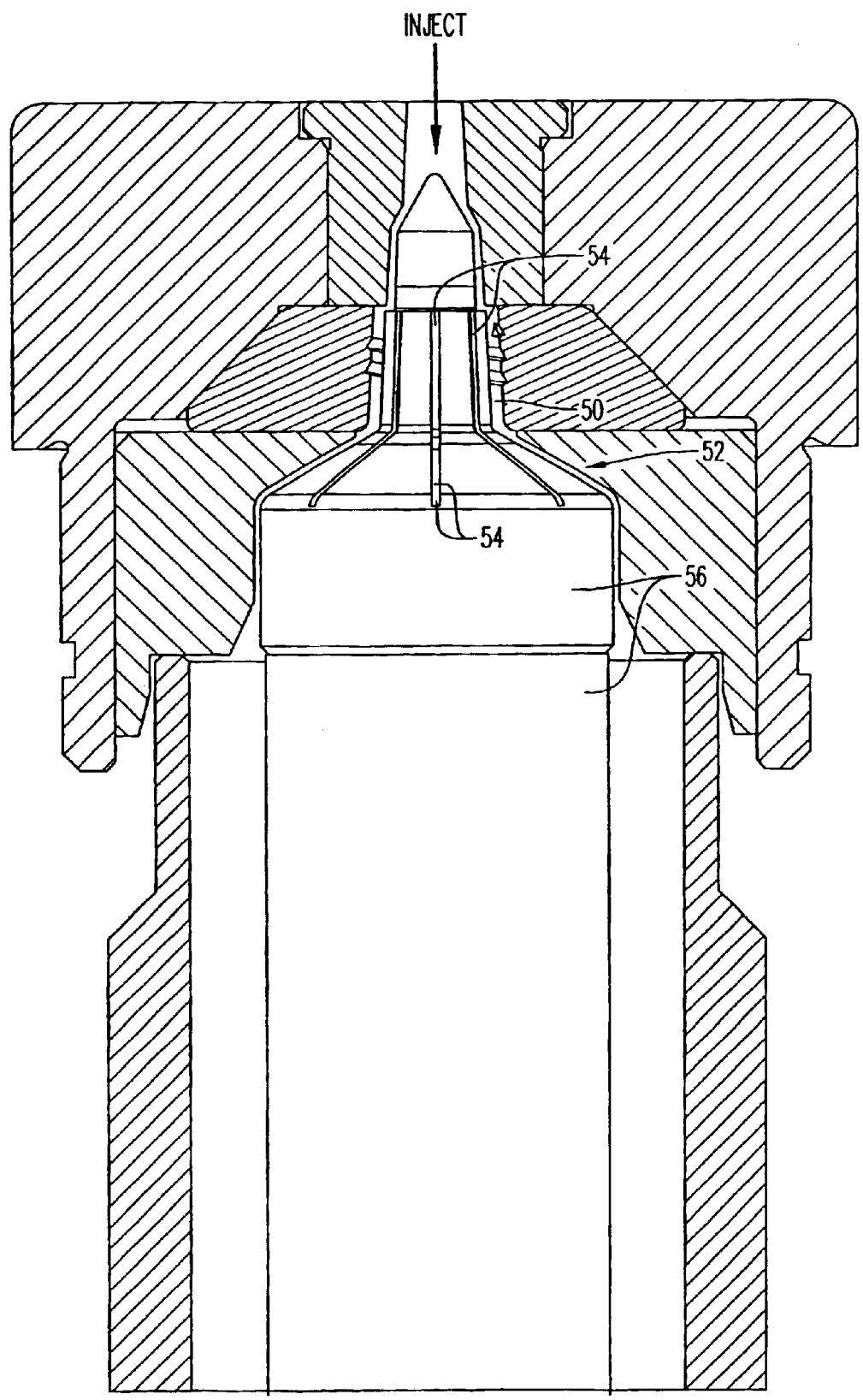
Figure 15:
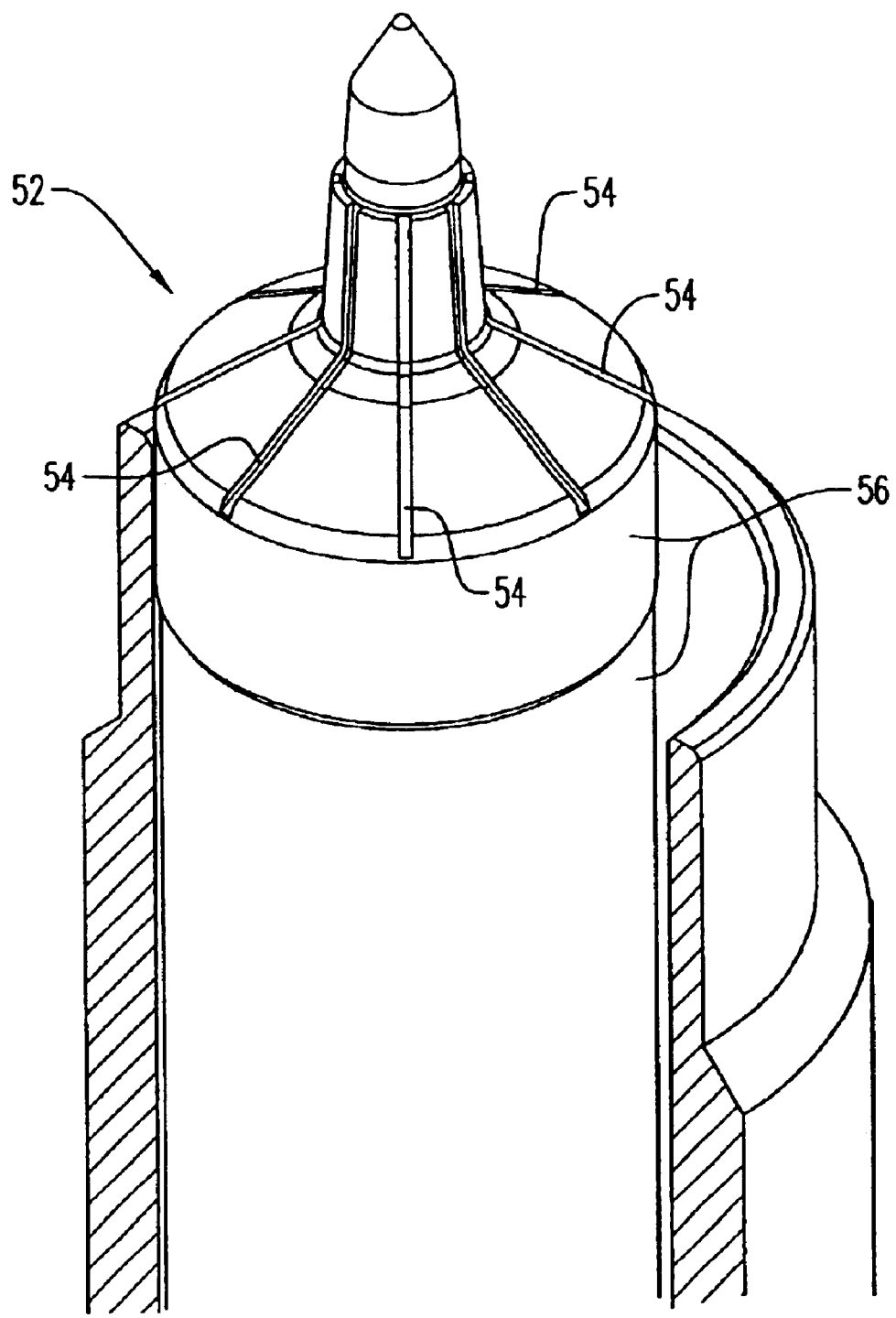

FIGS. 13 through 15 show a preferred conventional set of injection molding tools of the Tuboplast process that have been modified for forming the head and container of the invention.

The head of the invention is made with less material than would a head of equal size be made without the invention. An improved low cost head is therefore provided. Containers utilizing the head are low cost containers. The low cost containers with the thinned heads or shoulders of the heads joined to the body walls of the containers have the required rigidity in the neck and shoulder of the head, and they have a sufficiently strong bond at the joint between the shoulder and body. The bond at the joint provides a hermetic seal for commercial applications.

The heads and collapsible dispensing containers of the invention can be made by slight modification and use of any suitable method and apparatus. Referring to FIGS. 13–15, a preferred method is to inject the plastic material that is to form the head into a mold cavity 50 that is shaped in the form of the head. The molten plastic material is injected from above into the cavity portion that forms the rim of the neck of the head. According to the invention, male tooling, here shown, for example, as the male die member 52 that forms the interior surface of the head, has axial grooves 54 therein that are designed to form the ribs on the interior surface of the head, as the head is being molded. In the preferred process, a tubular body, often referred to as a sleeve (not shown), is positioned on a male mandrel 56 that is axially aligned with the female die member that forms the head. This method and apparatus, without the modification of the invention, is well known in the art. When the head is formed, the molten plastic material flows into and along the grooves to the lower end portion or edge of the shoulder of the head. The grooves provide channels for the flow of the molten material to the lower portion of the shoulder of the head. Enough of the molten material reaches the lower portion of the shoulder at a temperature and pressure that is high enough to form a good bond with the upper end portion or rim of the tubular body. The head and body are left in the mold long enough to bond them together and cool sufficiently that they are securely bonded or joined together. Conventional molding temperatures and materials can be employed. Conventional head forming methods and apparatus modified in accordance with the invention can be employed. This includes pre-molding a head and assembling it to a tubular body in a second operation. The pre-molds can be formed by injection, compression, and thermoforming. Assembly can be effected by induction welding, spin welding and various known processes using heat and pressure. The tubular containers of the invention can be formed by compression molding or thermoforming the head, in each case with simultaneous bonding to the tubular body or sleeve. The heads can also be formed by injection blow molding and perform blow molding. The preferred process and apparatus to be modified according to the invention is well known to those skilled in the art as the Tuboplast process and apparatus. This involves injection of the head and simultaneous bonding of the head to the tubular body or sleeve. This process is disclosed in one or more expired U.S. patents and will be described more fully herein. Thus, other than mainly for providing and utilizing grooves in the male tooling or male die member, or of course in the female tooling to form ribs on the outer surface of the head, the tooling and the process can be conventional.

As stated above, the head of the invention and container bodies of the invention can be formed by conventional compression molding processes and apparatus. In compression molding, the mold cavity is open and the heated plastic material, usually a metered dose thereof, is deposited into the open mold. The mold is closed under pressure. This moves the plastic around the cavity to form the head and simultaneously join it to the sleeve on the mandrel. The male die member in this process is adapted according to the invention to have grooves to flow material to the joint area and to form the rigidifying ribs.

The plastic material that flows through the grooves preferably leaves the ends of the grooves and flows circumferentially around the mandrel forms the lower end of the shoulder and forms a good bond about the entire periphery of the joint between the head, usually the lower end of the shoulder, and the tubular body.

The use of a reduced amount of plastic material in the head reduces cycle time in producing the heads. The grooves for the ribs and the flow of molten material through the grooves assures that there is enough plastic material to form a good bond and that the plastic is hot enough that it flows to the joint area and is hot enough and has enough pressure when it reaches the area and to form a good bond, e.g., with the upper portion of the body wall. The invention is not to be limited by the words used to describe the bond at the joint between the shoulder and the head. Any suitable joint, fusion of materials or connection can be employed. A bond does not require but could have an adhesive.

Traditional injection and compression molded tube heads for a 1 inch diameter tube, measured through the frustoconical portion web of the shoulder of the conventional head, are designed with a typical 1 mm/0.040" thick cross section. For such a sized tube, the preferred cross section according to the invention, measured through the web portion of the shoulder between the ribs, is about 0.51 mm/0.024" thick. The thickness of a cross section through the shoulder and an underlying rib is the same or about the same as the conventional shoulder thickness of 0.040". The preferred thickness of the web area between the ribs is about 0.023" to about 0.024", plus or minus 0.005". The interstitial web thickness is sufficient to render the head self-supporting or freestanding. Above 0.030" there is less need for ribs. If the shoulder of the tube is less than 0.015" thick, the chances increase that there may not be an adequate bond. The invention is especially advantageous for tubes whose diameters are from about ¾" to about 1½" or about 2".

The container bodies of the invention can be made by yet other injection molding processes and apparatus. One such method allows the head and shoulder of the invention to be molded according to the invention as a single entity separately from a body or sleeve. Later, the head is joined to the body or sleeve in a conventional secondary assembly process with suitable materials, temperatures and pressures. The head would be loaded onto a mandrel and heated enough to form a satisfactory bond to the body or sleeve. Any of several of such processes, e.g., induction welding, spin welding, etc. can be employed.

The heads and bodies of the invention can be formed with any suitable materials. Preferably, the head comprised polyethylene, preferably high or low-density polyethylene. The preferred materials for the head have a melt index of from about 1 to 2, although by no means is this range to be considered a limitation. For example, the melt index for the injected perform head could be up to 12 or more.

The drawings show the preferred rib dimensions for the tube described. Those persons of skill in the art will know how to adjust rib widths etc. to suit the application. If the flow path is too thin, it will be difficult for the plastic to have enough heat at the shoulder to provide a good bond.

The ribs can be in any suitable design or configuration. For example, they can branch to distribute material at more points or areas about the circumference of the tube. The ribs can be formed in any suitable pattern.

The heads of the invention provide about a 25% reduction in materials for the tube shown on Sheet A of the drawings. As the size of the tube increases, more savings are provided. The ribs of the invention can be of any suitable thickness, number and arrangement, so long as the grooves to form them allow a sufficient amount of the particular moldable material being employed to flow at the to flow at the desired temperatures to the desired location, and to preferably provide sufficient rigidity to rigidify the head as needed for the process employed and the handling and uses intended.

What is claimed is:

1. A method of molding a dispensing tube having a thin head joined to a tubular body, which comprises:

molding the head of a material that is moldable at elevated temperatures in a tool set having a mold cavity shaped in the form of a head and formed by female tooling for forming the exterior surface of the head and by a male die member for forming the interior surface of the head such that the head will have an inner surface, an outer surface, a neck with an upper end, and a shoulder having a lower end for being joined to the upper end of the tubular body, providing a plurality of elongated axial grooves in the outer surface of the male die member, the axial grooves extending axially from the upper end of the portion of the die member that forms the neck to end at the portion of the die member that forms the lower end of the shoulder, the axial grooves providing channels for flow of the moldable material in molten state from the neck to the lower end of the shoulder, providing in the mold cavity a circumferential groove connecting the axial grooves at the lower end of the shoulder, providing a tubular body having an upper end in the mold tooling such that the upper end is axially aligned with the female die member that forms the shoulder, providing the moldable material at an elevated temperature in a molten state into the mold cavity that is to form the head, flowing the moldable material along the axial grooves and the circumferential groove to and about the lower end of the shoulder at an elevated temperature and pressure, there being provided enough moldable material at the elevated temperature and pressure to the lower end of the mold cavity to join the upper end of the tubular body to the lower end of the shoulder, and utilizing said moldable material provided through the axial grooves and the circumferential groove for joining the upper end of the tubular body to the shoulder to form the dispensing tube, such that the inner surface of the head has a plurality of elongated ribs that are formed in the axial grooves, said ribs rigidifying the shoulder of the head and allowing the shoulder to be formed of less moldable material and to be thinner and the bond between the shoulder and the tubular body stronger than in the absence of said axial grooves and said ribs.

2. The method of claim 1, wherein the male tooling is provided with eight axial grooves therein.

* * * * *